(12) United States Patent
Wang et al.

(10) Patent No.: US 10,013,114 B2
(45) Date of Patent: Jul. 3, 2018

(54) LIGHT TOUCH PANEL, LIGHT TOUCH DISPLAY SCREEN AND LIGHT TOUCH DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Huan Wang, Beijing (CN); Mookeun Shin, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/779,194

(22) PCT Filed: Nov. 14, 2014

(86) PCT No.: PCT/CN2014/091104
§ 371 (c)(1),
(2) Date: Sep. 22, 2015

(87) PCT Pub. No.: WO2016/029556
PCT Pub. Date: Mar. 3, 2016

(65) Prior Publication Data
US 2016/0306499 A1    Oct. 20, 2016

(30) Foreign Application Priority Data

Aug. 26, 2014 (CN) .......................... 2014 1 0424826

(51) Int. Cl.
*G06F 3/042* (2006.01)
*G06F 3/041* (2006.01)

(52) U.S. Cl.
CPC ............ *G06F 3/0421* (2013.01); *G06F 3/042* (2013.01); *G06F 3/0412* (2013.01); *G06F 3/0416* (2013.01)

(58) Field of Classification Search
CPC .... G06F 3/0421; G06F 3/0412; G06F 3/0416; G06F 3/042
See application file for complete search history.

(56) References Cited

U.S. PATENT DOCUMENTS

2004/0179160 A1    9/2004  Rhee et al.
2007/0080282 A1    4/2007  Fann
(Continued)

FOREIGN PATENT DOCUMENTS

CN    1530724 A     9/2004
CN    2852188 Y    12/2006
(Continued)

OTHER PUBLICATIONS

International Search Report & Written Opinion of the International Searching Authority Appln. No. PCT/CN2014/091104; dated May 20, 2015.
(Continued)

*Primary Examiner* — Abhishek Sarma
(74) *Attorney, Agent, or Firm* — Ladas & Parry LLP

(57) ABSTRACT

A light touch panel, a light touch display screen and a light touch display device are disclosed. The light touch panel includes a substrate (1) and one or more light sensitive elements (2) disposed on the substrate, wherein the light sensitive elements (2) are configured to convert touch infrared light incident onto them into current signals to facilitate determining a touch position of the touch infrared light according to the electric current signals. The light touch panel converts touch infrared light that is incident onto it into current signals with light sensitive elements, thereby
(Continued)

enabling the light touch panel to determine touch position of touch infrared light more accurately and sensitively, and in turn improve light touch performance of light touch panels.

14 Claims, 4 Drawing Sheets

(56) References Cited

U.S. PATENT DOCUMENTS

2008/0136794 A1* 6/2008 Ishikawa ............ G02F 1/13338
345/175
2008/0150848 A1* 6/2008 Chung ................. G06F 3/0412
345/82
2009/0289910 A1 11/2009 Hattori

FOREIGN PATENT DOCUMENTS

| CN | 101587256 A | 11/2009 |
|---|---|---|
| CN | 101819340 A | 9/2010 |
| CN | 101963716 A | 2/2011 |

OTHER PUBLICATIONS

Second Chinese Office Action dated Mar. 31, 2017; Appln. No. 201410424826.0.
First Chinese Office Action dated Sep. 28, 2016; Appln. No. 201410424826.0.

* cited by examiner

LIGHT TOUCH PANEL, LIGHT TOUCH DISPLAY SCREEN AND LIGHT TOUCH DISPLAY DEVICE

TECHNICAL FIELD

Embodiments of the present invention relate to a light touch panel, a light touch display screen and a light touch display device.

BACKGROUND

With the development of multimedia technologies, touch panels are applied more and more widely, for example, in aspects such as information inquiry, industrial control, multimedia education and so on. Touch panels have advantages of such as being robust and durable, fast response speed, saving space, easy communication and so on. With this kind of technology, a user can perform operations by simply lightly touch pictures and texts displayed on a display screen with his or her finger or other touch component, thereby making man-machine interactive more straightforward, and significantly facilitating users.

A kind of long range touch panel involves a long range infrared touch panel. At present, a long range infrared touch panel is generally provided with a light sensitive element at each of two corners of the display panel respectively. When an infrared light dot is projected onto a display panel, light rays of the dot would be scattered onto the two light sensitive elements. These two light sensitive elements receive the scattered partial infrared light and determine the touch position of the infrared light dot on the display panel according to the light intensity difference between the received two rays of infrared light, and in turn touch control the touch panel.

The above-mentioned long range infrared touch panel that implements infrared touch by receiving scattered light of infrared light dot is susceptible to external infrared light (only a fraction of light may enters the detectors after the infrared light dot is scattered, resulting in a weak light intensity received by detectors), thereby resulting in less accurate determination of touch position of an infrared light dot, and low touch resolution and sensitivity.

SUMMARY

Embodiments of the present invention provide a light touch panel, a light touch display screen and a light touch display device. The light touch panel converts touch infrared light that is incident onto it into electric current signals with light sensitive elements, therefore can determine touch position of touch infrared light more accurately and sensitively, and in turn improve light touch performance of light touch panels.

At least one embodiment of the present invention provides a light touch panel, including a substrate and one or more light sensitive elements disposed on the substrate, wherein the light sensitive elements are configured to convert touch infrared light incident onto them into current signals to facilitate determining a touch position of the touch infrared light according to the electric current signals.

For example, the light sensitive element comprises hydrogenated nanometer silicon film for sensing touch infrared light and converting touch infrared light signals into current signals.

For example, the light sensitive elements are uniformly distributed on the substrate in a matrix and have the same shape and size.

For example, each of the light sensitive elements is connected with a current output line respectively, and the light touch panel may further include a control unit which, when the light touch panel includes the control unit, is connected with the current output lines respectively, and the control unit is configured to determine a touch position of the touch infrared light according to corresponding current signals output by the current output lines.

Another embodiment of the present invention further provides a light touch display screen including a display panel having any of the above-mentioned light touch panels disposed on the light extraction side of the display panel.

For example, a plurality of pixels are provided on the display panel, the plurality of pixels are uniformly distributed in a matrix and each of the pixel comprises a plurality of sub-pixels. For example, each of the pixels comprises a red sub-pixel, a green sub-pixel and a blue sub-pixel arranged in a row direction in which the pixels are located and having same shape and size.

For example, light sensitive elements in the light touch panel are correspondingly located between any two adjacent ones of the pixels in each row of the pixels, and the light sensitive elements have same shape and size as the red sub-pixels, the green sub-pixels or the blue sub-pixels.

For example, light sensitive elements in the light touch panel are correspondingly located between any two adjacent ones of the pixels in rows of the pixels spaced apart from each other by one or more rows successively, and the light sensitive elements have same shape and size as one sub-pixel.

For example, in the one or more rows of the pixels as interval rows on the display panel, a white sub-pixel is disposed between any two adjacent ones of the pixels in each row, the white sub-pixels have same shape and size as the one sub-pixel.

For example, the display panel is equally divided into a plurality of regions with an equal area, and each of the regions is correspondingly distributed with m×n of the pixels, wherein m is a number of the pixels in each row in the region, n is a number of the pixels in each column in the region, $1<m<$ a total number of the pixels in a row on the display panel; $1<n<$ a total number of the pixels in a column on the display panel, and m and n are both integers;

for example, the light sensitive elements may have the same shape as one of the sub-pixels, for example, rectangle, but have different sizes. In this light touch display screen, an area of the pixel≤an area of the light sensitive element≤an area of the region.

An embodiment of the present invention further provides a light touch display device including a light touch device and any one of the above-mentioned light touch display screens, wherein the light touch device is configured to emit touch infrared light onto the light touch panel in the light touch display screen to touch control the light touch display screen.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS

1: substrate; 2: light sensitive element; 3: current output line; 4: display panel; 5: light touch panel; 6: pixel; 61: red sub-pixels; 62: sub-pixels; 63: blue sub-pixels; 64: white sub-pixels; 7: region; 8: control unit.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
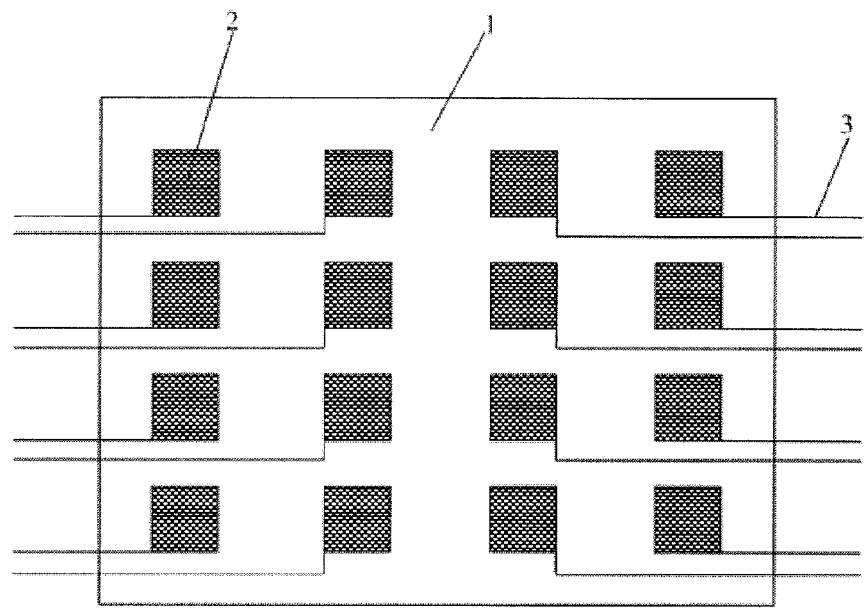
FIG. 1 is a structure diagram of a light touch panel in embodiment 1 of the present invention.

The present embodiment provides a light touch (touch control) panel as shown in FIG. 1, including a substrate 1 and one or more light sensitive elements 2 disposed on the substrate 1 for converting touch infrared light that is incident onto them into electric current signals to facilitate determining touch position of touch infrared light according to the electric current signals.

For example, the light sensitive element 2 is hydrogenated nanometer silicon film for sensing touch infrared light and converting the touch infrared light into electric current signals. Hydrogenated nanometer silicon film is a silicon nanometer structure formed by embedding nanometer order silicon crystal grains (also referred to as microcrystal silicon) into the hydrogenated amorphous silicon (a-Si: H) network with a chemical vapor deposition or sputtering process, and it has higher carrier mobility than hydrogenated amorphous silicon, namely a better electrical conductivity. Also, the hydrogenated nanometer silicon has a large absorption coefficient for touch infrared light, can convert absorbed touch infrared light into electric current signals, and is an ideal optoelectronic conversion device. In addition, hydrogenated nanometer silicon further possesses features such as convenient large area manufacturing, low cost and adaptation to practical applications.

Figure 2:
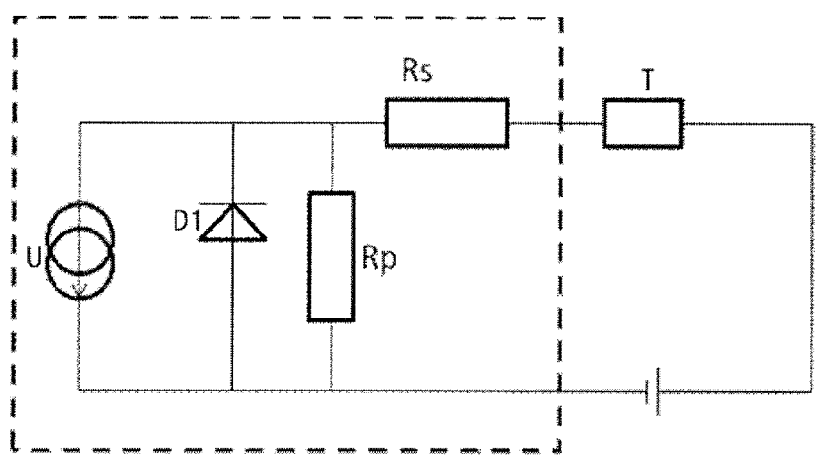
FIG. 2 is all equivalent circuit diagram of light sensitive elements in FIG. 1.

FIG. 2 shows a basic equivalent circuit diagram of light sensitive elements 2. In FIG. 2, in the dashed box is the equivalent circuit of hydrogenated nanometer silicon film, that is, a piece of hydrogenated nanometer silicon film can be equivalent to an optoelectronic conversion diode circuit, where Rs and Rp are series resistance and parallel resistance respectively, D1 is a photodiode, and the specific values of series resistance and parallel resistance are determined by the material, structure and technology process of the photodiode. As an optoelectronic conversion device, hydrogenated nanometer silicon film can generate photocurrent after being irradiated by touch infrared light, that is, the hydrogenated nanometer silicon film can function as a current source U while being irradiated by touch infrared light. It is possible to detect the value of output current of the current source U with a galvanometer T connected externally to the equivalent circuit.

Compared to the solution in which a real light touch position is determined by detecting scattered light of a touch infrared light dot with light sensitive elements, light sensitive elements 2 in the present embodiment can absorb touch infrared light that is incident onto them and convert it into electric current signals. Since touch infrared light incident onto light sensitive elements 2 directly is much stronger than external infrared light in terms of light intensity and can be absorbed by light sensitive elements 2 directly, a light touch panel adopting these light sensitive elements 2 is hardly interfered with external infrared light, thereby improving light touch performance of light touch panel.

In this embodiment, there may be provided a plurality of light sensitive elements 2 that are uniformly distributed on the substrate 1 into a matrix/array and having the same shape and size. Such an arrangement can enable the light touch panel to sense touch infrared light incident onto it at any location, that is, whichever position where the touch infrared light is incident onto the light touch panel, it can be absorbed and converted into electric current signals by light sensitive elements 2 disposed at corresponding positions. This increases the light touch resolution of the light touch panel. Since each light sensitive element 2 can absorb and convert touch infrared light incident onto them, thereby allowing more accurate and sensitive determination of light touch position. For example, the determination of light touch position can be as accurate as to the extent of a specific point on the light touch panel. In addition, the arrangement of light sensitive elements 2 in the present embodiment does not influence the compactness of the structure of the entire light touch panel.

Figure 7:
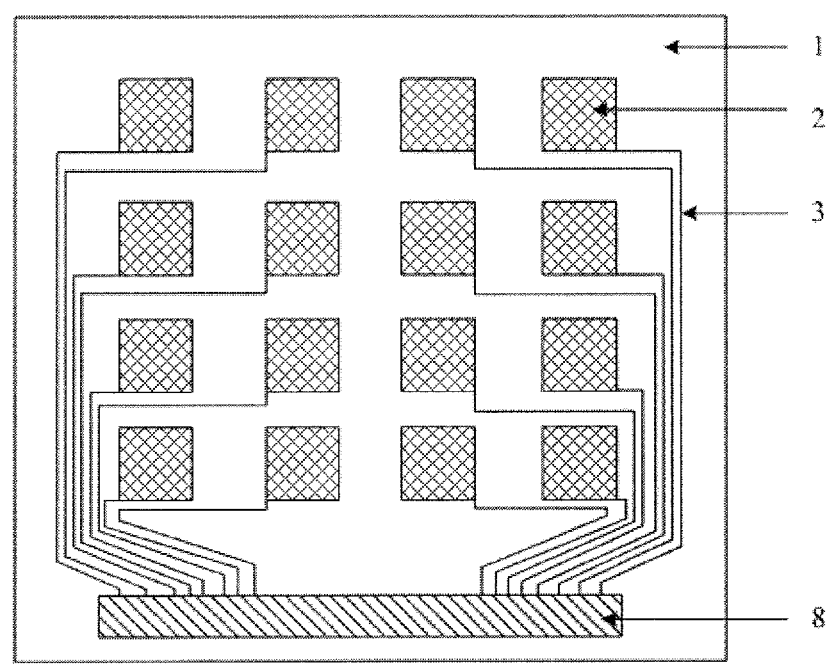
FIG. 7 is a schematic diagram of the scheme of light touch panel including a control unit in embodiment 1 of the present invention.

In this embodiment, each light sensitive element 2 is connected with an electric current output line 3. For example, the light touch panel may further include a control unit 8 (as shown in FIG. 7) disposed at the periphery of the substrate 1. Each current output line 3 is connected with the control unit 8 respectively, that is, each light sensitive element 2 is connected to the control unit 8 via a current output line 3. The control unit 8 is configured to determine a touch position of touch infrared light according to the current signals output from corresponding current output lines 3. More specifically, the control unit 8 receives current signals from light sensitive elements 2 through current output lines 3 and converts the current signals into coordinates of positions of the light sensitive elements 2, thereby implementing determination of light touch position.

An example will be described in brief below. Since each current output line 3 is connected with a light sensitive element 2 correspondingly, the control unit can know the positions of light sensitive elements 2 by means of pre-stored information for corresponding current output lines 3 (including coordinates of positions of light sensitive elements 2). That is, when touch infrared light is incident onto a certain light sensitive element 2, the light sensitive element 2 absorbs touch infrared light and converts it into current signals that are in turn output to the control unit 8 via a corresponding current output line 3 connected with the light sensitive element 2. The control unit 8 converts the current signals output over the current output line 3 into coordinates of positions of light sensitive elements 2 and thereby obtaining specific position light touch. While in this process, other light sensitive elements 2 are not irradiated by the touch infrared light dot, and will not output current signals, then current output lines 3 connected with light sensitive elements 2 in one-to-one correspondence will not output currents to the control unit 8. Therefore, the control unit 8 can determine that touch infrared light has not touched other light sensitive elements.

The light touch panel provided in embodiment 1 converts touch infrared light that is incident onto it into electric current signals with light sensitive elements, thereby enabling the light touch panel to determine touch position of touch infrared light more accurately and sensitively, and in turn improve light touch performance of light touch panels.

Embodiment 2

Figure 3:
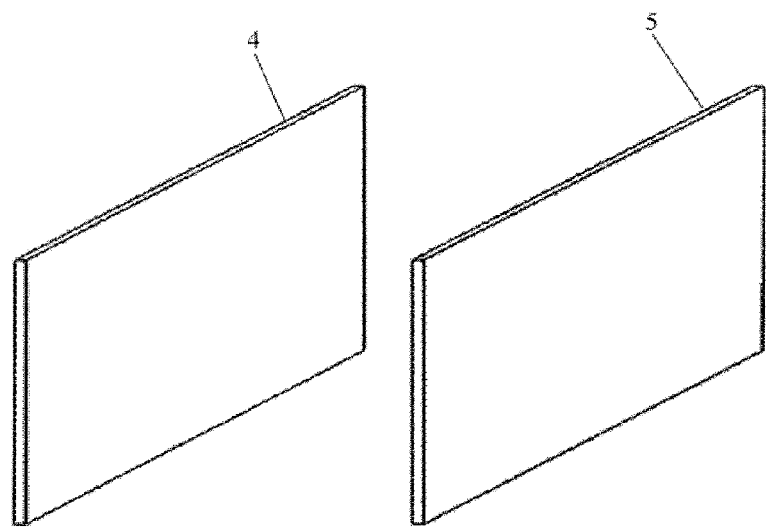
FIG. 3 is an exploded schematic diagram of structural composition of a light touch display screen in embodiment 2 of the present invention.
Figure 4:
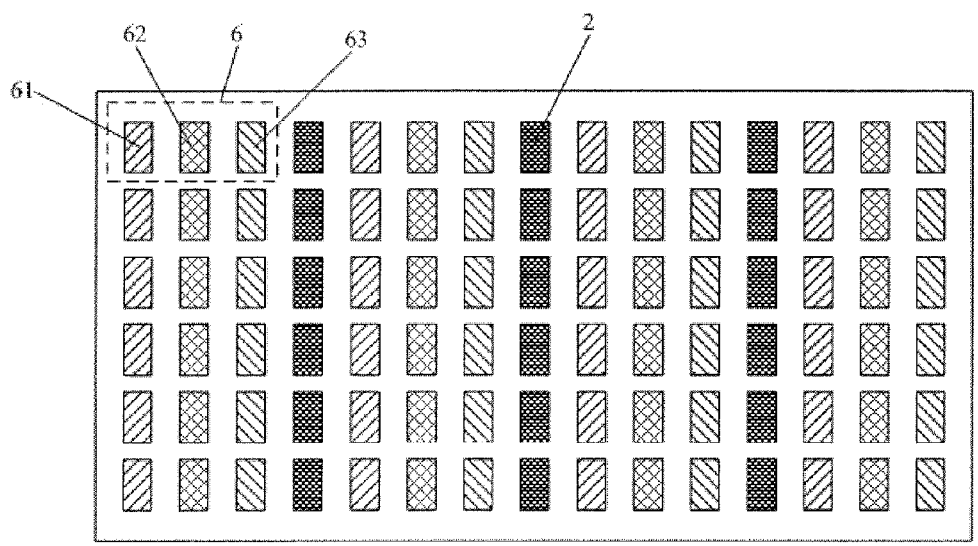
FIG. 4 is a top view of structure of the light touch display screen in FIG. 3.

The present embodiment provides a light touch (touch control) display screen, as shown in FIGS. 3 and 4, including a display panel 4 with any of the light touch panels 5 described in embodiment 1 disposed on its light extraction side.

In this embodiment, the display panel 4 is provided with a plurality of pixels 6 distributed uniformly in a matrix. For example, each pixel 6 includes a red sub-pixel 61, a green sub-pixel 62 and a blue sub-pixel 63. For example, the red sub-pixel 61, green sub-pixel 62 and blue sub-pixel 63 are arranged in the row direction of pixels 6 and have the same shape and size.

For example, light sensitive elements 2 in the light touch panel 5 are located correspondingly between any two adjacent pixels 6 in each row of pixels 6, and shape and size of light sensitive elements 2 may be the same as red sub-pixels 61. Such an arrangement allows a large distribution density of light sensitive elements 2 in the region corresponding to the display panel 4, which makes the touch resolution of light touch display screen to substantially reach the same order of display resolution of display panel 4, thereby drastically increasing the touch resolution of light touch display screen and in turn drastically improving touch performance of the light touch display screen.

In this embodiment, the used display panel 4 may include a liquid crystal display panel, a light emitting diode (LED) display panel and an organic light emitting diode (OLED) display panel. Of course, the display panel 4 is not limited to the above-mentioned ones, any display panel 4 that can implement light touch by disposing a light touch panel thereon is within the scope of the present invention.

In addition, it is to be noted that the control unit of light touch panel 5 is connected with the central control module in the display panel 4. The central control module is for example a central processing unit (CPU) for controlling display of the display panel and the touch of display panel by the light touch panel 5. When touch infrared light is incident onto the light touch panel 5, the display panel 4 would respond to the touch position of touch infrared light according to signals transmitted to its central control module by the control unit, thereby manipulating the light touch display screen by touch infrared light. It is specifically described below.

The control unit converts the received current signals into position coordinates of a light touch dot, and then transmits position coordinates to CPU that determines the operation to be executed in the next step according to the function corresponding to the touch position. For example, an intelligent TV adopts this light touch display screen. In order to delete a movie stored in the storage of the intelligent TV, firstly, an touch infrared light dot is projected onto the "delete" key shown on the display screen, and the light sensitive element 2 corresponding to the "delete" key will output current signals to the control unit connected therewith. The control unit converts the current signals into coordinates of the position of the light sensitive element 2 and transmits the coordinate information to the CPU that will execute the operation of deleting the movie according to the internal program.

Embodiment 3

Figure 5:
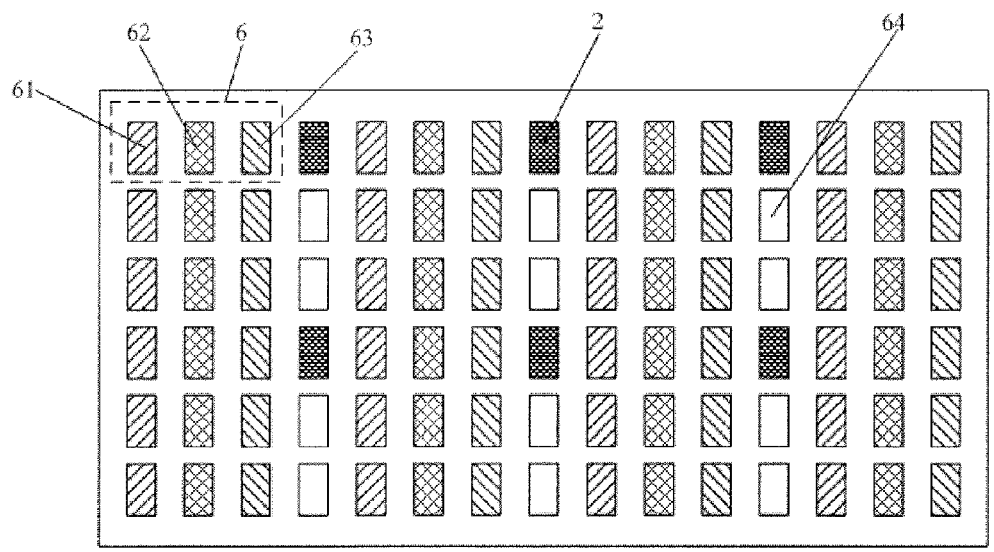
FIG. 5 is a top view of structure of the light touch display screen in embodiment 3 of the present invention.

The present embodiment provides a light touch (touch control) display screen that is different from embodiment 2 in that, as shown in FIG. 5, light sensitive elements 2 in the light touch panel are correspondingly located between any two adjacent pixels 6 in pixel rows spaced apart from each other by one or more rows successively and the shape and size of light sensitive elements 2 may be the same as red sub-pixels 61.

As compared to embodiment 2, the distribution density of light sensitive elements 2 in the region corresponding to the display panel in the present embodiment is reduced. However, this is also sufficient to realize manipulation of good light control over the light touch display screen, since in practices, in most cases, the number of light sensitive elements 2 disposed in a light touch panel is not necessarily equivalent to the number of pixels 6 on the display panel at all.

The arrangement of light sensitive elements in the present embodiment can still allow the light touch resolution of light touch display screen much higher than that of an ordinary light touch display screen, thereby allowing the light touch performance of light touch display screen in the present embodiment much better than that of an ordinary light touch display screen.

In addition, in the present embodiment, in the one or more rows of pixels 6 as interval rows on the display panel, there may be disposed a white sub-pixel 64 between any two adjacent pixels 6 in each row, which has the same shape and size as the red sub-pixel 61. Although since the light sensitive elements 2 are accordingly located over the orthogonal projection of display panel, they will more or less block a portion of light from the backlight of the display panel, the provision of white sub-pixels 64 can not only compensate the slight reduction of display brightness of the display panel due to the provision of light sensitive elements 2, but also can further improve the display brightness of the display panel.

The remaining structure of light touch display screen in the present embodiment is the same as that of any of light touch display screens described in embodiment 2 and will not be described any more here.

Embodiment 4

Figure 6:
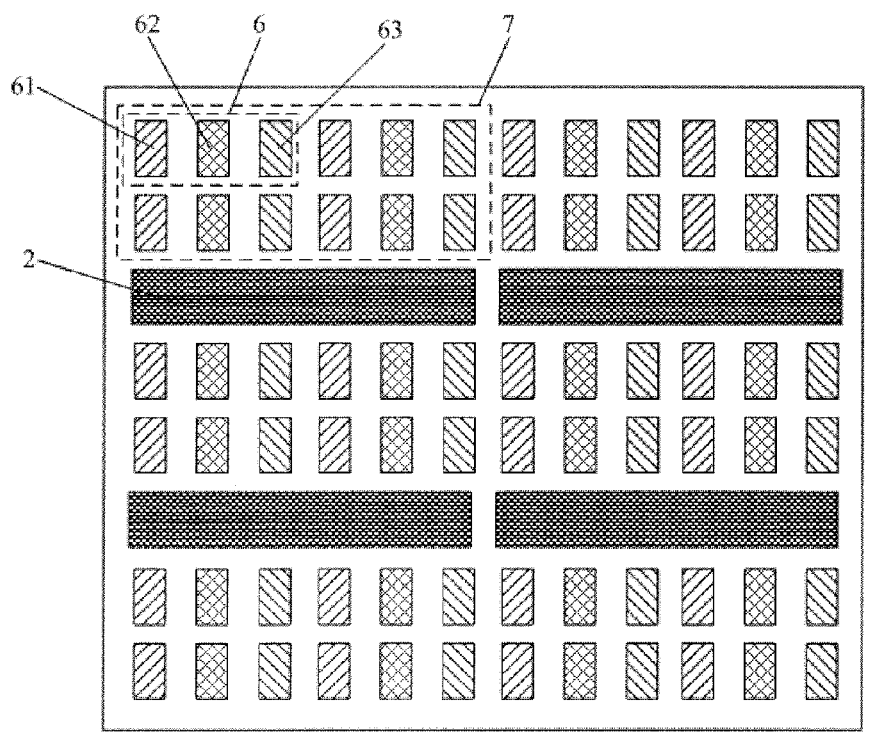
FIG. 6 is a top view of structure of the light touch display screen in embodiment 4 of the present invention.

The light touch (touch control) display screen provided in the present embodiment is different from that of embodiments 2 to 3 in that, as shown in FIG. 6, the display panel is equally divided into a plurality of regions 7 with equal areas, each of which is correspondingly distributed with m×n pixels 6, where m is the number of pixels 6 in each row in a region 7, n is the number of pixels 6 in each column in a region 7, 1<m<the total number of pixels 6 in a row on the display panel; 1<n<the total number of pixels 6 in a column on the display panel, and m and n are both integers; and light sensitive elements 2 in the light touch panel are correspondingly located between any two adjacent regions 7 in each column of regions 7.

As compared to embodiments 2 and 3, the distribution density of light sensitive elements 2 in corresponding display panel regions in the present embodiment is reduced, however it is nevertheless sufficient to implement well light touch manipulation of the light touch display screen.

In this embodiment, for example, the light sensitive elements 2 may have the same shape, namely be of a rectangle, as the red sub-pixel 61, but have different sizes. In this light touch display screen, the area of a pixel 6≤the area of a light sensitive element 2≤the area of region 7. As compared to embodiments 2 and 3, the area of a light sensitive element 2 in the present embodiment is increased, which can not only make the manufacturing of light touch panel easier, but also make the alignment between display panel and light touch panel more convenient. In addition, although the number of light sensitive elements 2 correspondingly distributed in the display panel region is reduced, since the minimum resolution of light touch panel can still be configured to be of the same order of magnitude as the resolution of display panel, light sensitive elements 2 arranged as such can still allow the light touch resolution of light touch display screen much higher than that of a traditional light touch display screen, thereby allowing a light touch performance of light touch display screen in the present embodiment much better than that of a traditional light touch display screen.

The remaining structure of light touch display screen in the present embodiment is the same as that of any of light touch display screens described in embodiment 2 or 3 and will not be described any more here.

In the light touch display screen provided in embodiments 2-4, with the light touch panel in embodiment 1, the light touch resolution of light touch display screen is significantly improved, and thereby significantly improving light touch performance of the light touch display screen.

Embodiment 5

The present embodiment provides a light touch (touch control) display device including a light touch device and any of the light touch display screens described in embodiments 2-4. The light touch device is configured to emit touch infrared light onto the light touch panel in light touch display screen to touch control the light touch display screen.

For example, an infrared laser pointer or other device capable of emitting touch infrared light can be used as a light touch device.

By adopting any of the light touch display screens described in embodiments 2-4, the light touch performance of the light touch display device is significantly improved.

The above-mentioned display device may be any product or component with display function such as a cell-phone, a tab computer, a TV set, a display, a notebook computer, a digital picture frame or a navigator.

What are described above is related to the illustrative embodiments of the disclosure only and not limitative to the display of the disclosure; the scopes of the disclosure are defined by the accompanying claims.

The present application claims priority of China Patent application No. 201410424826.0 filed on Aug. 26, 2014, the content of which is incorporated by reference herein in its entirety as part of the present application.

The invention claimed is:

1. A light touch display screen, comprising:
a light touch panel, comprising a substrate and a plurality of light sensitive elements disposed on the substrate, wherein each of the plurality of light sensitive elements is configured to convert touch infrared light that is incident onto it into a current signal to facilitate determining a touch position of the touch infrared light according to the current signal; and
a display panel, with the light touch panel being disposed on a fight exit side of the display panel, the display panel including a plurality of pixels with each pixel including a white sub-pixel,
wherein in a direction perpendicular to the fight exit side of the display panel, the light sensitive elements are arranged in identical columns with white sub-pixels and outside the white sub-pixels, and adjacent light sensitive elements on the light touch panel that are in a same column are separated by at least one white sub-pixel on the display panel.

2. The light touch display screen according to claim 1, wherein the plurality of pixels are uniformly distributed in a matrix and each of the pixel comprises a plurality of sub-pixels.

3. The light touch display screen according to claim 2, wherein each of the pixels comprises a red sub-pixel, a green sub-pixel and a blue sub-pixel arranged in a row direction in which the pixels are located and having a same shape and size.

4. The light touch display screen according to claim 2, wherein each light sensitive element in the light touch panel is correspondingly located between two adjacent ones of the pixels in rows of the pixels spaced apart from each other by one or more rows successively, and the light sensitive elements have a same shape and size as one sub-pixel.

5. The light touch display screen according to claim 4, wherein in the one or more rows of the pixels as interval rows on the display panel, the at least one white sub-pixel is disposed between any two adjacent ones of the pixels in each row, the at least one white sub-pixel has a same shape and size as the one sub-pixel.

6. The light touch display screen according to claim 2, wherein the display panel is equally divided into a plurality of regions with an equal area, and each of the regions is correspondingly distributed with m×n of the pixels, wherein m is a number of the pixels in each row in the region, n is a number of the pixels in each column in the region, 1<m<a total number of the pixels in a row on the display panel; 1<n<a total number of the pixels in a column on the display panel, and m and n are both integers; and
light sensitive elements in the light touch panel are correspondingly located between any two adjacent ones of the regions in each column of the regions.

7. The light touch display screen according to claim 6, wherein an area of the pixel≤an area of the light sensitive element≤an area of the region.

8. A light touch display device comprising a light touch device and a light touch display screen of claim 1,
wherein the light touch device is configured to emit touch infrared light onto the light touch panel in the light touch display screen to touch control the light touch display screen.

9. The light touch display screen according to claim 1, wherein each of the light sensitive elements comprises a hydrogenated nanometer silicon film.

10. The light touch display screen according to claim 1, wherein the light sensitive elements are uniformly distributed on the substrate in a matrix.

11. The light touch display screen according to claim 10, wherein each of the light sensitive elements are connected with a current output line respectively, the light touch panel further comprises a control unit connected with the current output line respectively, and the control unit is configured to determine a touch position of the touch infrared light according to a corresponding current signal output by the current output line.

12. The light touch display screen according to claim 9, wherein the light sensitive elements are uniformly distributed on the substrate in a matrix.

13. The light touch display screen according to claim 12, wherein each of the light sensitive elements are connected with a current output line respectively, the light touch panel further comprises a control unit connected with the current output line respectively, and the control unit is configured to determine a touch position of the touch infrared light according to a corresponding current signal output by the current output line.

14. The light touch display screen according to claim 1, wherein the light sensitive elements and the white sub-pixels have a same size.

* * * * *